United States Patent
Fernandez Alonso et al.

(10) Patent No.: US 9,935,778 B2
(45) Date of Patent: Apr. 3, 2018

(54) SELECTION OF A POLICY AND CHARGING CONTROL UNIT BY A DIAMETER ROUTING UNIT

(71) Applicant: Telefonaktiebolaget L M Ericsson (Publ), Stockholm (SE)

(72) Inventors: Susana Fernandez Alonso, Madrid (ES); Fabian Castro Castro, Arillo/Oleiros/A Coruña (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 100 days.

(21) Appl. No.: 14/893,346

(22) PCT Filed: Jul. 3, 2013

(86) PCT No.: PCT/EP2013/064034
§ 371 (c)(1),
(2) Date: Nov. 23, 2015

(87) PCT Pub. No.: WO2015/000514
PCT Pub. Date: Jan. 8, 2015

(65) Prior Publication Data
US 2016/0127137 A1    May 5, 2016

(51) Int. Cl.
*H04L 12/14* (2006.01)
*H04L 12/24* (2006.01)
*H04M 15/00* (2006.01)

(52) U.S. Cl.
CPC ...... *H04L 12/1407* (2013.01); *H04L 41/0893* (2013.01); *H04M 15/66* (2013.01)

(58) Field of Classification Search
CPC . H04L 41/0893; H04L 12/1407; H04M 15/66
See application file for complete search history.

(56) References Cited

U.S. PATENT DOCUMENTS

| 2011/0165901 | A1 | 7/2011 | Baniel et al. |
| 2013/0064093 | A1* | 3/2013 | Ridel ............... H04L 47/125 370/236 |

(Continued)

FOREIGN PATENT DOCUMENTS

| EP | 2536179 A1 | 12/2012 |
| WO | 2010108770 A2 | 9/2010 |

OTHER PUBLICATIONS

International Search Report and Written Opinion dated Aug. 16, 2013 for International Application No. PCT/EP2013/064034, International Filing Date Jul. 3, 2013, consisting of 12 pages.

(Continued)

*Primary Examiner* — Brian D Nguyen
(74) *Attorney, Agent, or Firm* — Christopher & Weisberg, P.A.

(57) ABSTRACT

The invention relates to a method to route a diameter message of a data packet session in a mobile communications network. A diameter routing unit receives a diameter message and checks whether an indicator is set, the indicator indicating that the message relates to a data packet session for which a policy and charging control unit has already been selected. When the indicator is set the policy and charging control unit is identified and the message is transmitted to the identified policy and charging control unit.

20 Claims, 9 Drawing Sheets

(56) References Cited

U.S. PATENT DOCUMENTS

| | | | | |
|---|---|---|---|---|
| 2013/0183962 A1* | 7/2013 | Li | ............................ | H04L 45/18 |
| | | | | 455/424 |
| 2013/0311672 A1* | 11/2013 | Chastain | ............... | H04L 67/143 |
| | | | | 709/238 |
| 2013/0325941 A1* | 12/2013 | Mann | .................... | H04L 45/304 |
| | | | | 709/204 |
| 2013/0326058 A1* | 12/2013 | Brady | ................. | H04L 43/0888 |
| | | | | 709/224 |
| 2014/0068102 A1* | 3/2014 | Mann | ...................... | H04L 67/28 |
| | | | | 709/238 |
| 2014/0171089 A1* | 6/2014 | Janakiraman | ........ | H04L 63/0892 |
| | | | | 455/445 |

OTHER PUBLICATIONS

3GPP TS 23.203 V11.8.0 (Dec. 2012), 3rd Generation Partnership Project; Technical Specification Group Services and System Aspects; Policy and Charging Control Architecture; (Release 11), Dec. 18, 2012, consisting of 179 pages.

3GPP TS 29.212 V11.7.0 (Dec. 2012), 3rd Generation Partnership Project; Technical Specification Group Core Network and Terminals; Policy and Charging Control (PCC); Reference Points; (Release 11), Dec. 20, 2012, consisting of 196 pages.

3GPP TS 29.213 V11.5.0 (Dec. 2012), 3rd Generation Partnership Project; Technical Specification Group Core Network and Terminals; Policy and Charging Control Signaling Flows and Quality of Service (QoS) Parameter Mapping; (Release 11), Dec. 20, 2012, consisting of 189 pages.

\* cited by examiner

SELECTION OF A POLICY AND CHARGING CONTROL UNIT BY A DIAMETER ROUTING UNIT

TECHNICAL FIELD

The invention relates to a method, by a diameter routing unit, to route a diameter message of a data packet session using a diameter protocol in a mobile communications network and to the corresponding diameter routing unit. The invention furthermore relates to a method of transmitting a diameter message of the data packet session by a policy and charging enforcement unit and to the corresponding policy and charging enforcement unit. Furthermore, the invention relates to a method of transmitting a diameter message of the data packet session to the diameter routing unit as carried out by a bearer binding and event reporting unit and to the corresponding bearer binding and event reporting unit.

BACKGROUND

The architecture that supports the policy and charging control functionality in a mobile communications network is disclosed in 3GPP 23.203, chapter 5.1.

Figure 1:
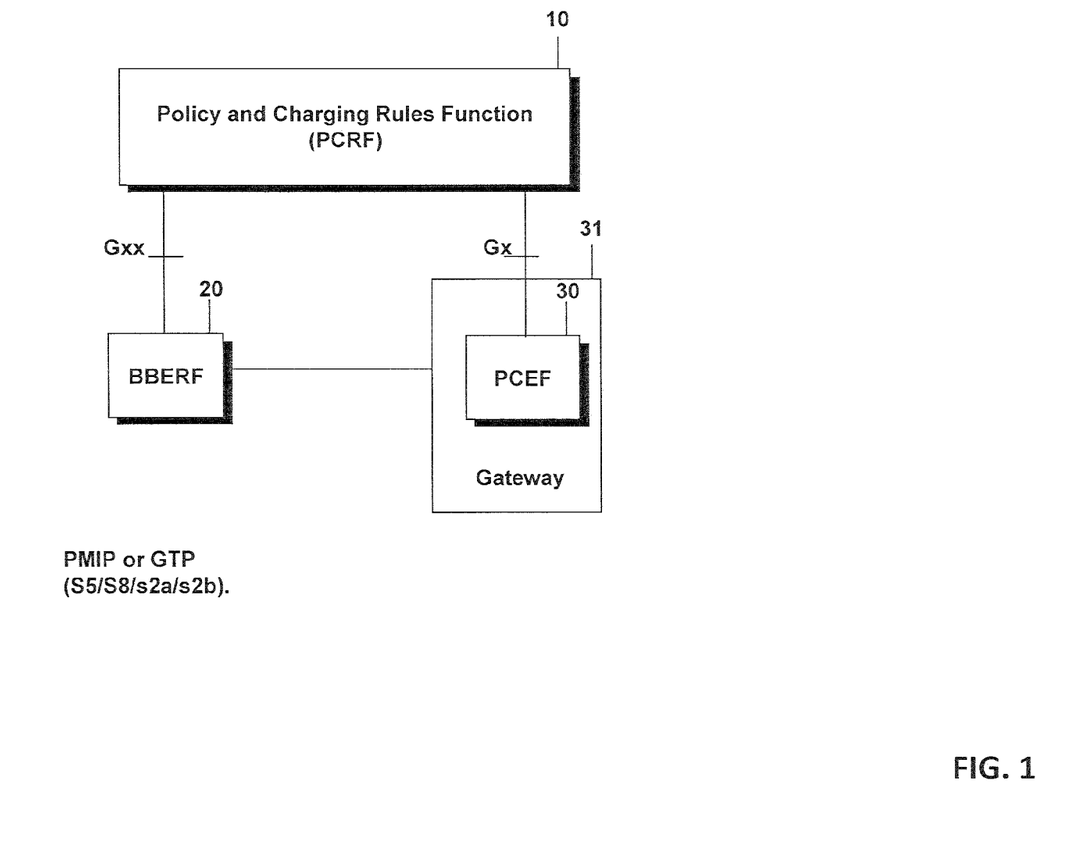
FIG. 1 is a schematic block diagram indicating a policy and charging control architecture in a 3GPP communications network.

In FIG. 1 the relations between the functions/units: PCRF (Policy and Charging Rules Function) 10, BBERF (Bearer Binding and Event Reporting Function) 20 and PCEF (Policy and Charging Enforcement Function) 30 are shown.

The PCEF 30 encompasses service data flow detection, policy enforcement and flow-based charging functionalities. This functional entity is commonly located at a gateway 31 (e.g. GGSN (Gateway GPRS Support Node) in the GPRS (General Packet Radio Service) case and PDG (Packet Data Gateway) in other cases). It provides service data flow detection, user plane traffic handling, triggering control plane session management (where the IP-CAN (IP Connectivity Access Networks) permits), QoS (Quality of Service) handling and service data flow measurement as well as online and offline charging interactions. The PCEF communicates with the PCRF via the so called "Gx" interface.

The entity BBERF 20 is the bearer binding and event reporting function. The BBERF 20 includes the functionalities of bearer binding, uplink bearer binding verification, event reporting to the PCRF and sending or receiving IP-CAN-specific parameters to or from the PCRF. The BBERF communicates with the PCRF via the so called "Gxx" interface.

The BBERF 20 controls the QoS that is provided to a combined set of service data flows and ensures that the resources which can be used by an authorized set of service data flows are within the authorized resources specified via the Gxx interface by "authorized QoS".

The PCRF 10 (Policy Control and Charging Rules Function) is also named policy and charging control unit named hereinafter a functional element that encompasses policy control decision and flow-based charging control functionalities. The PCRF 10 provides network control regarding the service data flow detection, gating, QoS and flow-based charging towards the PCEF and/or the BBERF. In other words, the PCRF acts as a policy decision point for QoS and/or charging policies in respect to nodes involved in the routing of packets of a data packet session, which acts as policy enforcing points for said policies (e.g. nodes implementing PCEF or BBERF functionalities).

The communications between a PCRF and a PCEF (i.e. via the so called "Gx" interface mentioned above), and between a PCRF and a BBERF (i.e. via the so called "Gxx" interface mentioned above) are commonly accomplished by using the "diameter" protocol. The "diameter" protocol is disclosed in e.g. IETF RFC 3588.

It shall be distinguished two scenarios depending on the protocol used between the BBERF 20 and the PCEF 30 functions:

Scenario a) GTP (GPRS Tunneling Protocol) protocol between BBERF 20 and PCEF Scenario b) PMIP (Proxy Mobile IPv6) protocol between BBERF 20 and PCEF 30

In the case of GTP the bearer control is performed in the PCEF 30. The PCRF 10 only sends policy information to the PCEF 30 via Gx, and the PCEF sends the applicable values including QoS information via GTP protocol to the BBERF 20.

In the case of PMIP, the bearer control is performed in the BBERF 20. The PCRF 10 shall provision PCC (Policy and Charging Control) rules to the PCEF via the Gx reference point and QoS rules to the BBERF 20 via the Gxx reference point. The reason is because PMIP protocol does not allow to convey information about QoS, and this forces the PCRF 10 to send the QoS values to the BBERF 20 and the BBERF 20 to make the bearer control according to the QoS information received from the PCRF 10.

In the case of PMIP, per each IP-CAN session, the PCRF 10 must handle one Gx session towards the PCEF and one Gxx session towards the BBERF 20. Both Gx and Gxx sessions for the same IP-CAN session should be linked in the PCRF in the same PCRF order to maintain PCC and QoS rules aligned between the PCEF 30 and the BBERF 20.

Figure 2:
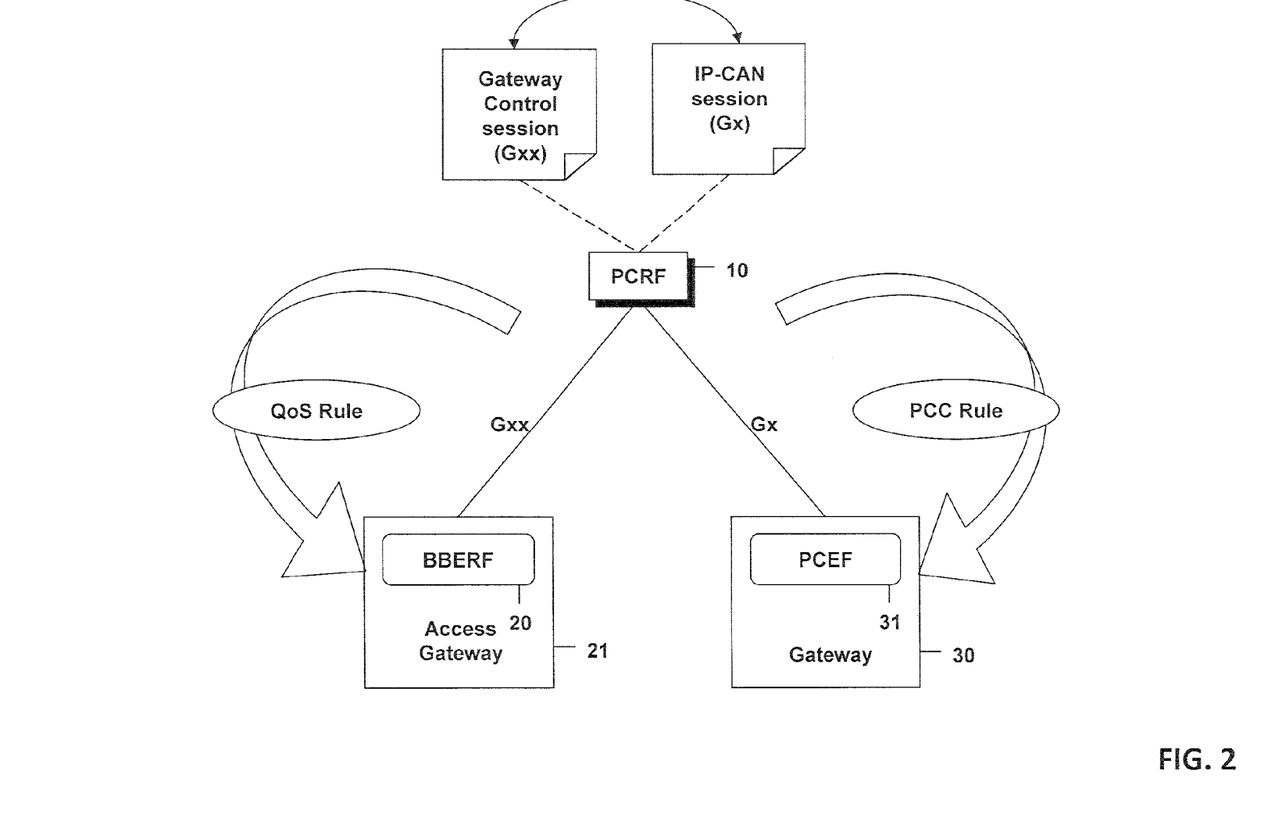
FIG. 2 is a schematic block diagram indicating the problem that an IP-CAN session should be linked to the same PCRF in order to maintain PCC and QoS rules.

This is also reflected by FIG. 2. The Gxx and Gx sessions are linked in the PCRF 10. The PCRF 10 shall further ensure consistency between the QoS rules transmitted from the PCRF 10 to the BBERF 20 and the authorized PCC rules provided to the PCEF 31.

Figure 3:
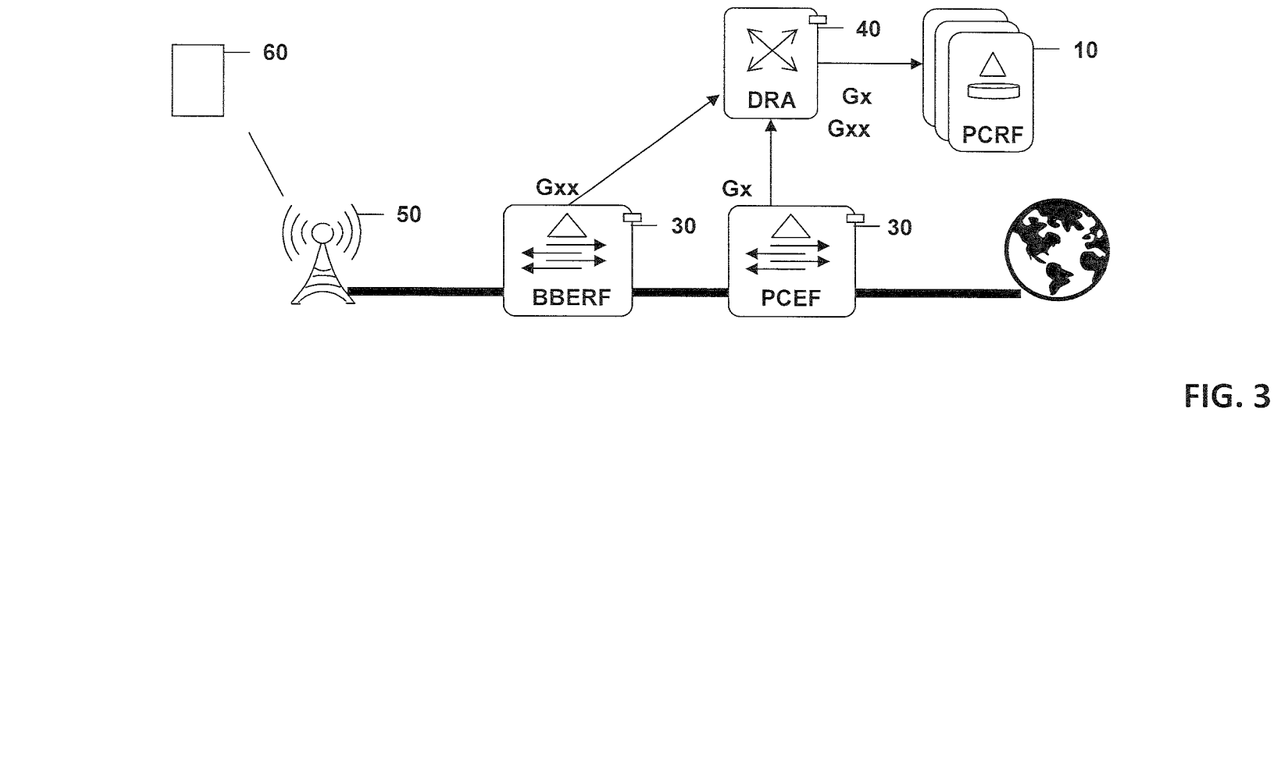
FIG. 3 is a schematic block diagram including a diameter routing unit/agent that is used for PCRF selection.

When there are multiple PCRFs deployed in the operator network, there is a need of another entity, a Diameter Routing Agent (DRA) 40 shown in FIG. 3, that is used to find a particular PCRF—among the plurality of PCRFs—within the operator realm and to initiate the transmission of a received diameter message to a particular PCRF.

In order to initiate the transmission of diameter messages to particular PCRFs among the multiple PCRFs deployed in the network, a DRA can act in two different modes: a "proxy mode" and a "redirect mode". In the "proxy mode" the DRA transmits directly a diameter message received from a diameter client (e.g. BBERF, PCEF) to the particular PCRF, whilst in the "redirect mode" the DRA—upon reception of a diameter message from a diameter client—responds to the diameter client with information about the particular PCRF to which the diameter message shall be finally transmitted (e.g. comprising an identifier of the particular PCRF). In other words, the DRA directs, either, directly or indirectly, a diameter message from a diameter client (BBERF, PCEF) to a particular diameter server (e.g. PCRF).

A user equipment 60 accesses the network via a radio access network 50.

When there are multiple PCRFs 10 deployed in the operator network, the PCRF clients will route towards the operator realm, using the UE (User Equipment) NAI (Network Access Identifier) or any other mechanism configured by the operator. The DRA 40 in that realm will be in charge of receiving those queries and assigning a PCRF in that network.

For PMIP cases, at session establishment, the BBERF 20 initiates a Gxx session towards a PCRF 10 selected by the DRA 40. To assure the coordination between Gx and Gxx session, the DRA 40 shall assign the same PCRF when the PCEF 30 establishes the corresponding Gx session for this IP CAN session.

Figure 4:
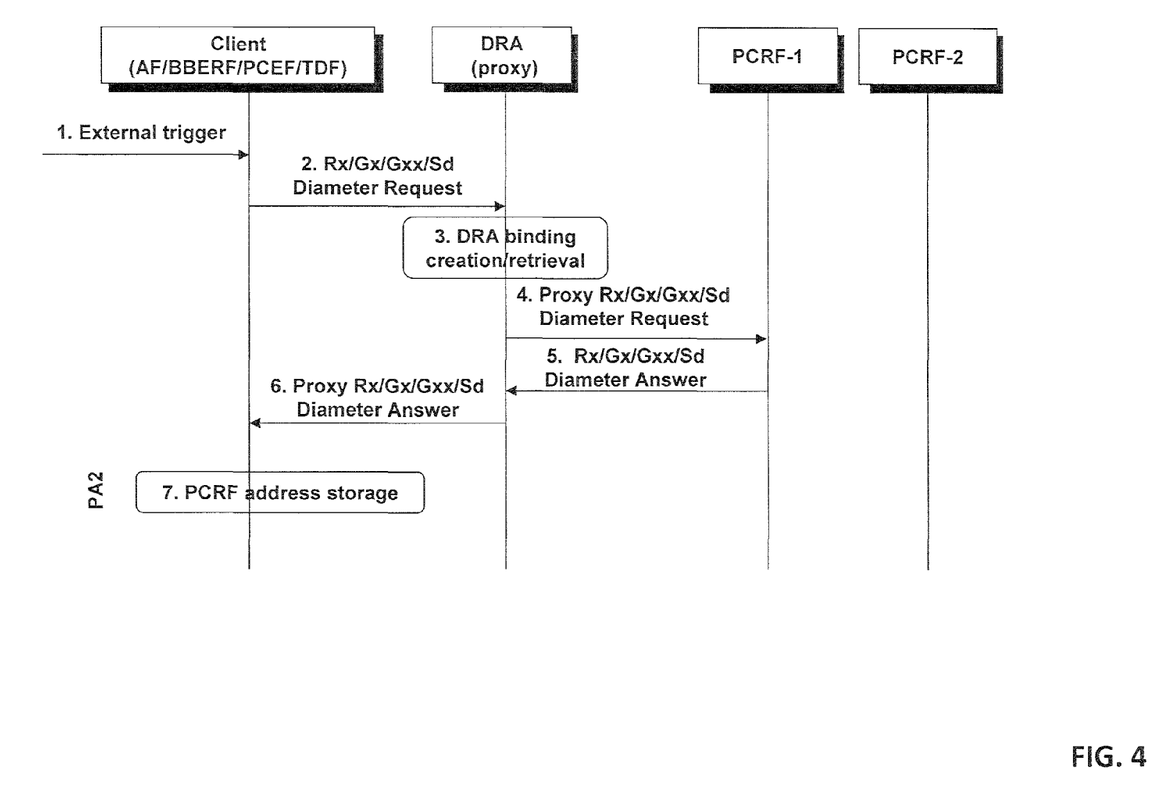
FIG. 4 shows a message flow in which a diameter routing unit selects a PCRF in a proxy mode.

The FIG. 4 extracted from 3GPP TS 29.213 shows that procedure when the DRA acts as a proxy.

As shown in step 1, the client receives an external trigger, e.g. an IP-CAN session establishment request that requires the establishment of a diameter session with a PCRF. In step 2, a diameter request is sent by the client and received by a DRA proxy. The DRA in step 3 stores the user information and checks whether an active DRA binding exists. If not, the DRA creates a dynamic DRA binding.

In step 4 the DRA (in proxy mode) proxies the diameter request to the target PCRF, here the PCRF-1. The proxy diameter request maintains the same session ID AVP (Attribute Value Pair) value. In step 5 the PCRF returns a diameter answer, in step 6 the DRA (proxy) proxies the diameter answer to the client. The client can, as an implementation option-cache the PCRF address received in the answer of step 6, and then send subsequent diameter messages directly to it using said address, thus bypassing the DRA.

In order to perform DRA binding, the DRA uses the IP-Address, APN information and subscriber identity for the selection of the PCRF. Once assigned, the DRA will check for every received query that there is a PCRF assigned for that IP-Address, APN and subscriber identity. Some of these identifiers are optional so the DRA will perform the binding process based on the received information.

For PMIP deployments, the Gxx Gateway Control Session Establishment can be received when the PDN connection is initiated or in handover scenarios, i.e. when the user changes the BBERF.

When it corresponds to a new PDN connection, the BBERF 20 as shown in FIG. 3 will initiate first a Gxx Session Establishment towards a PCRF 10 selected by the DRA 40, and afterwards the PCEF 30 will initiate a Gx Session Establishment towards the same PCRF than the one used for the Gxx session. i.e. the DRA shall assure that the same PCRF is used for the Gx session than the one previously selected for the Gxx session.

When it corresponds to a handover scenario, the DRA 40 shall assign the same PCRF 10 during the Gxx Gateway Control Session Establishment than the one assigned when the PDN connection was established in the previous access. Afterwards, since the PDN connection is being modified, the PCEF 30 will initiate a Gx session modification.

Figure 5:
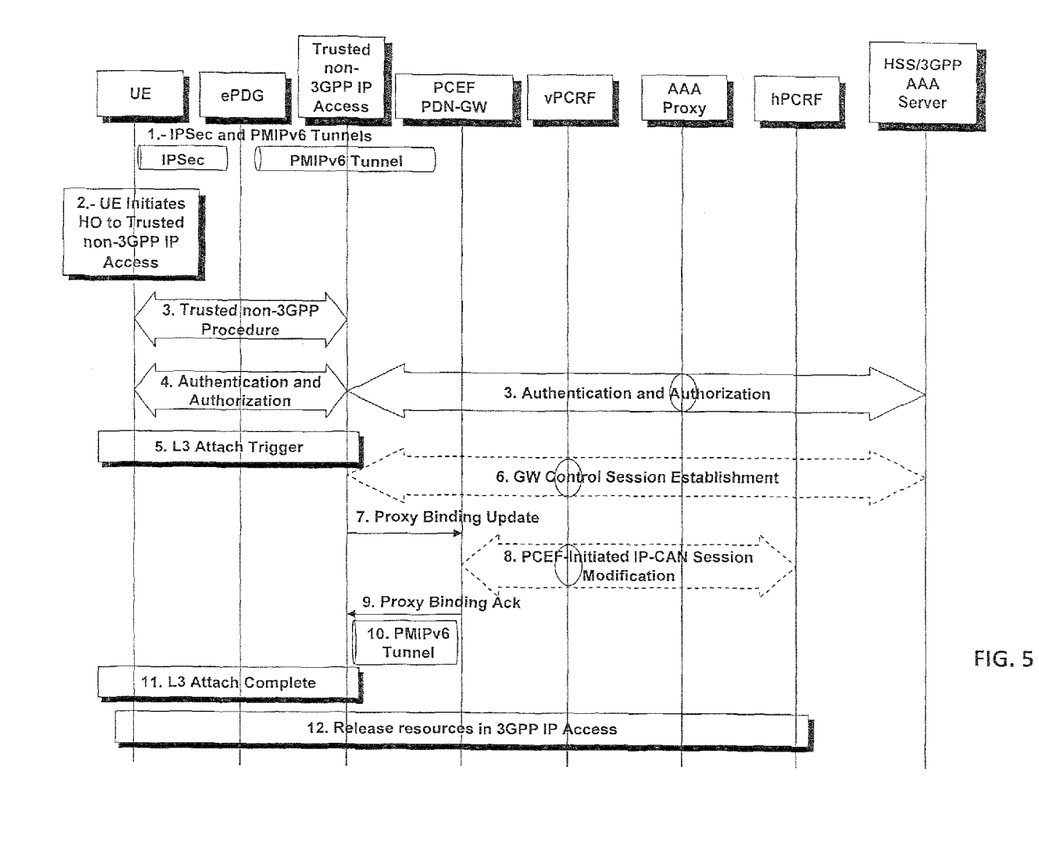
FIG. 5 shows a message flow diagram in which a mobile user entity attached to a 3GPP network moves to a non-3GPP network.

FIG. 5 extracted from 3GPP TS 23.402 tries to show the case. In this case a user attached to a 3GPP network moves to a non-3GPP network. Only steps 6 and 8 are relevant here. DRA is not shown in the figure. When present, both steps 6 and 8 would be routed to the DRA before going to the PCRF.

In step 1, as part of the PDN connection establishment in the 3GPP access, a first PCRF is selected by the DRA for the establishment of a Gx session between the PDN-Gw and the hPCRF.

In step 6 the non 3GPP network initiates a Gxx session with the PCRF. This message must be routed to the same PCRF that was handling the IP-CAN session for that subscriber, since this is a handover scenario, i.e. to the same PCRF than the one selected as part of step 1.

In step 8 the PCEF (PDN-GW) would indicate the PCRF that the IP-CAN session is being modified (Gx CCR-Update (Credit Control Request Update)).

Steps 7 and 9 are PMIP messages to establish the tunnel between the Trusted non-3GPP Gw implementing the BBERF function and the PDN-Gw (gateway).

If a DRA is included in the procedure, the messages in step 6 and 8 will be addressed to a DRA. The DRA has to assign the same PCRF that was assigned when the user initiated the PDN connection in the 3GPP network. However, according to the current procedures in the DRA, it will be understood as a new PCRF assignment because the DRA has not enough information to identify that this is a handover scenario, i.e, the DRA will behave as a new PDN connection establishment and it will assign any available PCRF.

In summary, the Gxx session from the BBERF can be addressed to a different PCRF than the one selected for the Gx session from the PDN-Gw. In the figure, step 6 and 8 will end in a different PCRF. The procedure will be incorrect.

On the other hand, regardless if there is a DRA deployed in the network, when the PCRF receives the Gxx query (step 6) it also has to know that it does not have to create a new IP-CAN session but has to link that session to an IP-CAN session that was previously created.

On the other hand, the PCRF assignment can be done at Gxx session establishment (PMIP cases) or at Gx session establishment (GTP cases). DRA is not aware about the operator deployment and thus, when it receives a Gx session establishment it would have to check whether there is an existing binding already created (i.e. a PCRF already assigned) for that Gx session. It would be done for all new session establishments. This will delay the procedures and would have performance impacts in the total procedure.

SUMMARY

Accordingly, a need exists to avoid at least some of the above-mentioned problems and to assure that an appropriate PCRF entity is selected for a message relating to a data packet session if necessary.

This need is met by the features of the independent claims. Further embodiments are described in the dependent claims.

According to a first aspect of the invention a method, by a diameter routing unit, is provided to route a diameter message of a data packet session using a diameter protocol in a mobile communications network in which at least two policy and charging control units are provided for policy and charging control of data packet sessions. According to one step of the method, a diameter message is received for a data packet session via a Gx interface or a Gxx interface. In a further step it is checked whether in the received diameter message an indicator is set, the indicator indicating that the received message received from any one of the two interfaces is relating to a data packet session for which another diameter message has already been received via the other of the two interfaces and for which the policy and charging control unit has already been selected. If the indicator is set in the message, a database—e.g. which can be an internal database of diameter routing unit, or which can be an external database accessible by the diameter routing unit—is accessed containing information which policy and charging control unit is handling which data packet session, the database furthermore containing information about the at least two policy and charging control units that are available for selection by the diameter routing unit. Additionally, the policy and charging control unit is identified that is controlling the data packet session to which the received diameter message belongs and the received diameter message is directed to the identified policy and charging control unit. However, if the indicator is not set, anyone of the at least two policy and charging control units is selected and the received diameter message is directed to the selected policy and charging control unit.

The content of the messages sent via the signaling interfaces Gxx or Gx are modified so as to include an explicit indication, i.e. the indicator, which indicates whether a session binding or a link between Gxx and Gx is requested or not. If the indicator is set, the session binding is necessary and the diameter routing unit identifies the PCRF that was selected for the session to which the received diameter message belongs. If no session binding is indicated, the diameter routing unit may select any available PCRF. If the indicator is set, the diameter routing unit may access its own database to identify the already selected policy and charging control unit, or it may access a database stored outside the diameter routing unit.

It is possible that the received diameter message is a message relating to a handover procedure from another mobile communications network to the mobile communications network to which the diameter routing unit belongs. Furthermore, it might be a message relating to a handover procedure between different access networks of the mobile communications network. As a consequence, the message may be applied in handover scenarios between 3GPP and non-3GPP networks, as well as in scenarios of handover between 3GPP access networks or between non-3GPP access networks, and also for roaming.

Preferably, the database may only be accessed for identifying the policy and charging control unit that is controlling the data packet session to which the received diameter message belongs, if the indicator is set. If the indicator is not set, the database is preferably not accessed for selecting anyone of the at least two policy and charging control units. This optimizes the procedure at the diameter routing unit for the IP-CAN session establishment over the Gx interface. The DRA unit based on the information whether the indicator is set or not determines whether it has to go through all the user existing Gxx sessions looking for an existing session binding in the database. In this embodiment the diameter routing unit only performs a lookup about binding data on an internal or external database only if the explicit indicator indicates that the message is relating to data packet session for which a policy and charging control unit has already been selected. When the indicator is not set, the diameter routing unit is free to select any of the available policy and charging control units, taking into account inter alia the load of the different policy and charging control units, or using a round robin procedure. As a consequence, the diameter routing unit only has to look up the binding data in some cases and not in all of the cases where a diameter message is received.

The diameter message may be received from a policy and charging enforcement unit via the Gx interface, the message initiating an IP-CAN session establishment procedure. If the indicator is set, the received message is relating to a data packet session for which the other diameter message was received from a bearer binding and event reporting unit via the Gxx interface.

Furthermore, it is possible that the diameter message is received from a bearer binding and event reporting unit via the Gxx interface, the message initiating a gateway control session establishment procedure. If the indicator is set, the received message is relating to a data packet session for which the other diameter message was received from a policy and charging enforcement unit via the Gx interface.

When the diameter message is received from the bearer binding and event reporting unit, it is possible that the diameter routing unit receives a second diameter message via the Gx interface and checks whether the indicator is set. If the indicator is set, the received second message is transmitted to the policy and charging control unit which was selected for the data packet session to which the other diameter message belonged.

In general, the indicator may be set if a packet data network connection is established by the mobile entity requesting the data packet session or when a PMIP protocol is used for the communication between the policy and charging enforcement unit and the bearer binding and event reporting unit.

The invention furthermore relates to the diameter unit routing which functions as mentioned above comprising a Gx interface configured to receive diameter messages from the policy and charging enforcement unit and a Gxx interface configured to receive diameter messages from the bearer binding and event reporting unit. The diameter routing unit furthermore comprises a processing unit configured to check, when a diameter message is received via one of the interfaces, whether in the received diameter message the indicator is set. If the indicator is set, the processing unit is configured to access a database containing information which policy and charging control unit is handling which data packet session and containing information about the at least two policy and charging control units that are available for selection by the diameter routing unit. The processing unit is then further configured to identify the policy and charging control unit that is controlling the data packet session to which the received diameter message belongs and to initiate a transmission of the received diameter message—directly (in proxy mode) or indirectly (in redirect mode)—to the identified policy and charging control unit. If the indicator is not set, the processing unit is configured to select anyone of the at least two policy and charging control units and to initiate a transmission of the received diameter message—directly (in proxy mode) or indirectly (in redirect mode)—to the selected policy and charging control unit. In a proxy mode, the received diameter message is directly transmitted to the identified policy and charging control unit if the indicator is set. In another mode—which is known as redirect mode—, the diameter routing unit generates an answer to the received message by sending an indication to the diameter client (BBERF, PCEF) from where the message was received, to which policy and charging control unit the diameter message should be sent; which prompts the diameter client (BBERF, PCEF) to send the diameter message to the policy and charging control unit indicated by the diameter routing unit.

The diameter routing unit, especially the processing unit, may be configured to operate as mentioned in more detail above.

Furthermore, the mobile communications network can comprise a 3GPP evolved packet core network.

According to another aspect of the invention, a method is provided by a policy and charging enforcement unit to transmit the diameter message of a data packet session using a diameter protocol to the diameter routing unit via a Gx interface. The policy and charging enforcement unit checks whether a PMIP protocol is used for a communication with a bearer binding and event reporting unit. If the PMIP protocol is used, an indicator is set in the diameter message for a data packet session initiating an IP-CAN session procedure. The indicator, as mentioned above, indicates to the diameter routing unit that the received diameter message relates to the data packet session for which another diameter message has already been received by the diameter routing unit via the Gxx interface and for which the policy and charging control unit has already been selected. If the PMIP protocol is not used, the indicator is not set. In a further step the diameter message is then transmitted to the diameter routing unit via the Gx interface. The indicator is then set or not in dependence on the above-identified condition. The invention furthermore relates to the corresponding policy and charging enforcement unit comprising the Gx interface and a processing unit which carries out the steps mentioned above.

According to another aspect of the invention a method carried out by a bearer binding and event reporting unit is provided which transmits a diameter message of a data packet session using the diameter protocol to the diameter routing unit via the Gxx interface. According to one step of the method an attachment status information of a mobile user entity that is attaching to the mobile communications network is identified. If the attachment status information indicates that handover is taking place or if the attachment status information indicates that the handover status is unknown, the bearer binding and event reporting unit sets the indicator in the diameter message for a data packet session to be transmitted to the diameter routing unit. The indicator indicates to the diameter routing unit that the received diameter message relates to a data packet session for which another diameter message has already been received by the diameter routing unit via the Gx interface and for which the policy and charging control unit has already been selected. If the attachment status information indicates that the mobile user entity is initially attaching to the mobile communications network, the indicator is not set. Furthermore, the diameter message is transmitted to the diameter routing unit via the Gxx interface with the indicator being set or not independence on the above identified condition.

The invention furthermore relates to the corresponding bearer binding and event reporting unit comprising a Gxx interface and a processing unit configured to carry out the steps mentioned above.

It is to be understood that the features mentioned above and those to be explained below can be used not only in the respective combinations indicated, but also in other combinations or in isolation.

BRIEF DESCRIPTION OF THE DRAWINGS

The foregoing and other features of the invention will become more apparent from the following detailed description of embodiments when read in conjunction with the accompanying drawings. In the drawings like reference numerals refer to like elements.

DETAILED DESCRIPTION

The embodiments described below provide a solution for network scenarios including a 3GPP evolved packet core network comprising also a policy and charging control architecture wherein a plurality of PCRFs exists and wherein a diameter routing unit (DRA) is used to select the appropriate PCRF destination for a message. The diameter unit can determine in a quick manner whether a particular PCRF should be selected or if any available PCRF can be selected. The solution described below comprises inter alia the step of modifying the content of the messages sent via the signaling interfaces Gxx and Gx so as to include an explicit indication whether session binding between Gxx and Gx is requested or not. In the following this indicator may also be symbolized by the expression that DRA binding is required or not.

Furthermore, the bearer binding and event reporting unit, BBERF, is configured to set the indicator in a message sent to the diameter routing unit if the handover status information it holds is equal to handover or to unknown. Furthermore, the indicator is not set if the handover status information it holds is equal to an initial attach status.

The policy and charging enforcement unit can be configured in such a way that the indicator is set by a message sent to the diameter routing unit via the Gx interface if the PMIP protocol is used for the communication with the BBERF. If the PMIP protocol is not used, but the GTP protocol, the PCEF is configured not to set the indicator.

A diameter routing unit is able to interpret this explicit indicator and can perform a lookup on binding data (e.g. the session binding data held by a database held internally by the diameter routing unit, or session binding data held by an external database) only if the indicator indicates that DRA binding is necessary. Otherwise, if the indicator is not set, the diameter routing unit is free to select anyone of the plurality of PCRFs and there is no need to check the binding data.

Accordingly, the performance of the diameter routing unit is enhanced when dealing with routing of received messages towards a PCRF, as it is only required to perform a lookup on the current binding data when the indicator is set.

For simplicity, in all the embodiments described below the diameter routing unit (DRA) is illustrated operating in "proxy mode", wherein its functionality for directing diameter messages to a particular PCRF among a plurality of PCRFs comprises transmitting directly from the DRA the diameter message to the particular PCRF. However, as commented earlier, the DRA might alternatively operate on "redirect mode". Whether the DRA operates on proxy or redirect mode does not interfere with, nor depends on, the processing on the DRA to determine whether a particular PCRF should be selected or if any available PCRF can be selected; which, as explained by embodiments of the present disclosure, is accomplished in a quick and efficient manner.

Figure 6:
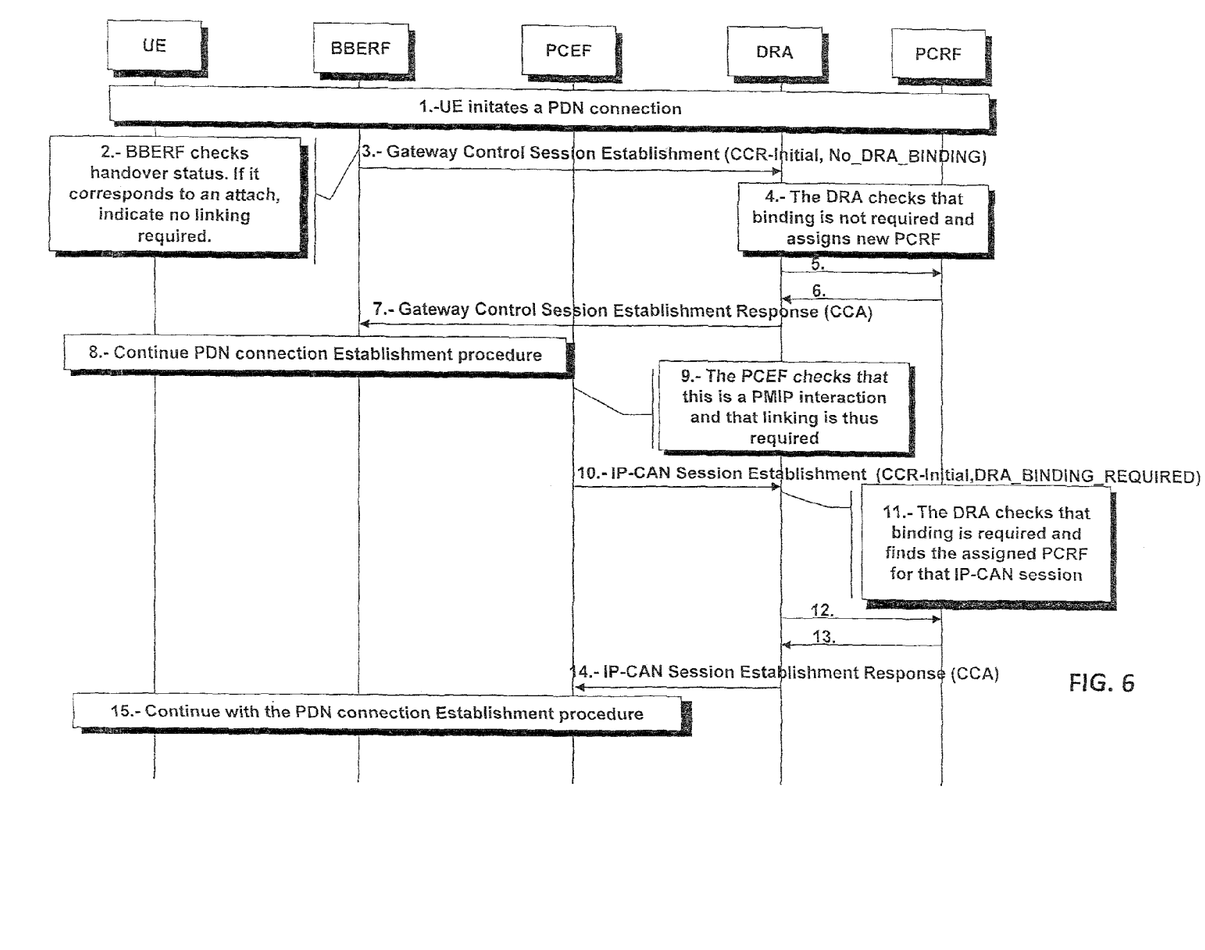
FIG. 6 shows a message flow diagram for an establishment of a PDN connection incorporating features of the invention.

In connection with FIG. 6 an embodiment of the invention is shown in which a PCRF is assigned when PMIP is used for the communication between the PCEF and the BBERF and when a PDN connection is established.

In step 1 of FIG. 6 the user equipment or mobile user entity (UE) initiates a PDN connection. In step 2 the BBERF checks, based on the information received from the UE, whether the user is attaching to the network or is in a handover situation. In the example shown the user is initiating a new PDN connection corresponding to an attachment. As a consequence, the BBERF sets the indicator to "DRA not binding", meaning that the indicator is not set based on the handover status information which is identified as being an initial attach situation.

In step 3 the BBERF initiates a gateway control session establishment and indicates that binding is not required, which means that the message does not relate to a data packet session for which a policy and charging control unit has already been selected. In step 4 the diameter routing unit, DRA, checks the indicator. Since binding is not required, it selects any available PCRF.

In steps 5 and 6 the DRA proxies the gateway control session establishment message to the selected PCRF and the PCRF answers with the policy decision results as the available QoS rules, the bearer QoS and the applicable event triggers.

In step 7 the DRA proxies the gateway control session establishment response to the BBERF. In step 8 the latter installs and enforces the received QoS rules and sends a PMIP proxy binding update message to the PCEF. In step 9 the PCEF checks that this is a PMIP interaction and that linking is required. As a consequence, in step 10 the PCEF initiates the IP-CAN session establishment procedure. Since the PCEF knows that PMIP is supported towards the BBERF, it will indicate that binding is required, so that the indicator is set. In step 11 the diameter routing agent checks the indicator. Since binding is required, it will select the same PCRF that was assigned in step 4. This is achieved by checking the binding data stored in a database of the diameter routing unit.

In step 12 and 13 the diameter routing unit proxies the IP-CAN session establishment message to the PRCF identified in step 11 and the PCRF answers with the policy decision results as the available PCC rules and the application event triggers. In another mode a message could be sent back to the PCEF indicating to the PCEF which PCRF has been selected so that the PCEF would transmit the message to the indentified PCRF.

In step 14 the DRA proxies the IP-CAN session establishment response to the PCEF and in step 15 the PCEF responds to the PMIP proxy binding update to the BBERF and the PDN connection is established towards the UE as normal procedures.

As can be seen from the above description of FIG. 6, the indicator in the IP-CAN session establishment message informs the diameter routing agent that this message belongs to a data packet session for which a PCRF has already been selected. As a consequence, in step 3 as the indicator is not set the binding data have not to be accessed so that the DRA is free to select any of the available PCRFs.

Figure 7:
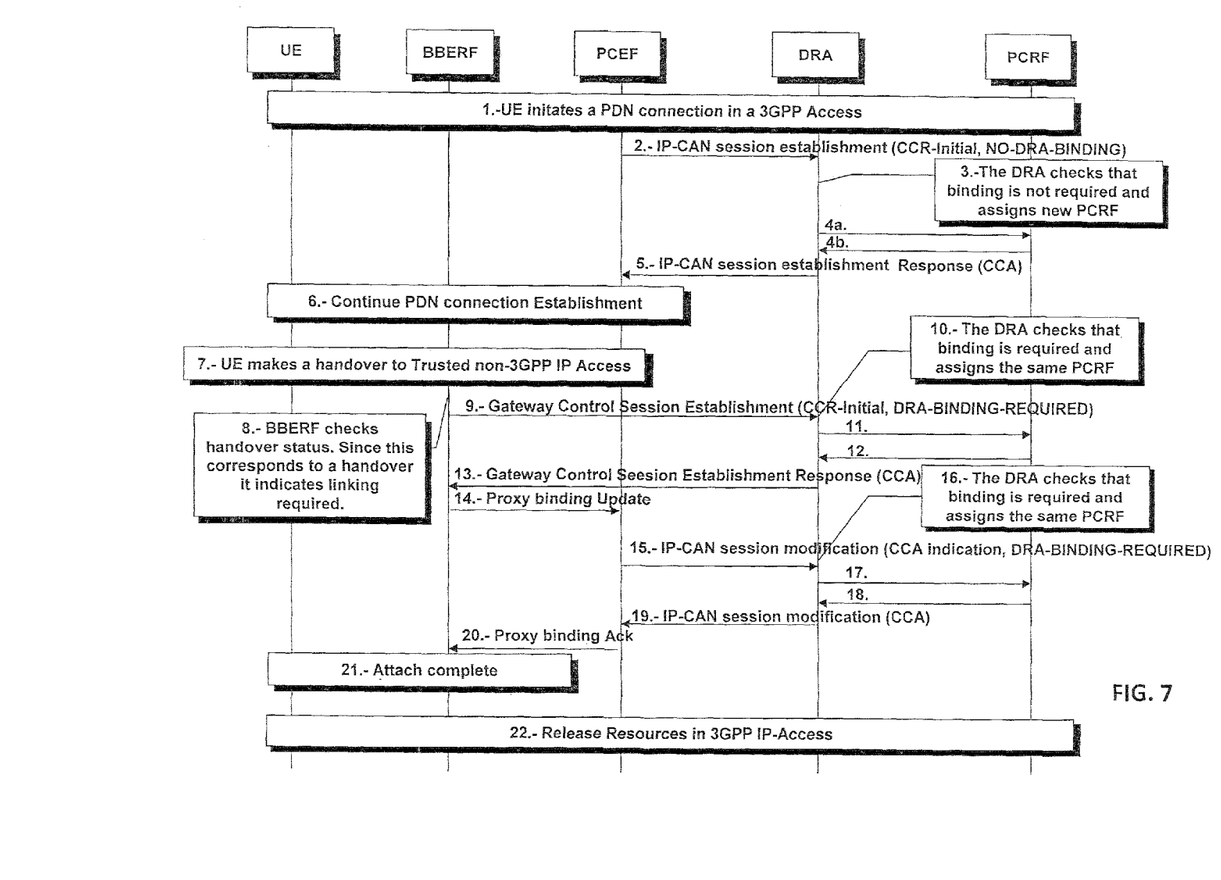
FIG. 7 shows a message flow of a handover situation between a 3GPP access to a non-3GPP access network in PMIP scenario incorporating features of the invention.

In connection with FIG. 7 the handover between a 3GPP access to a non-3GPP access is disclosed in more detail. In step 1 a mobile user entity initiates a PDN connection in a 3GPP access network. In the second step the PCEF initiates an IP-CAN session establishment towards the DRA indicating that the binding is not required, since it is a GTP deployment.

In step 3 the DRA, based on the information received, selects any available PROF and proxies the IP-CAN session establishment message to the selected PCRF. This is an enhancement in terms of performance for the DRA, since with the information received that no binding is required the DRA directly knows that there is no previously selected PCRF, i.e. the DRA does not have to go all the user existing bindings. In step 4a the DRA proxies the received message to a selected PCRF, the response being transmitted back to the DRA in step 4b.

In step 5 the DRA proxies the PCRF response to the PCEF. In step 6 the PDN connection establishment continues towards the UE, in step 7 the UE initiating a handover to a non-3GPP access. In step 8, the BBERF checks based on the information received from the UE if the user is attaching to the network or is in a handover situation. In the example shown the user is making handover. Thus, the BBERF sets the indicator considering that the handover status information that it holds is equal to handover.

In step 9 the BBERF initiates a gateway control session establishment and indicates that the binding is required. The DRA in step 10 checks the indicator. As binding is required, it selects the PCRF as the one previously selected in step 3. In steps 11 and 12 the DRA proxies the gateway control session establishment message to the selected PCRF and the PCRF answers with the policy decision results as available QoS rules, the bearer QoS and the applicable event triggers.

In step 13 the DRA proxies the gateway control session establishment response to the BBERF and in step 14 the BBERF installs and enforces the received QoS rules. Furthermore, the PMIP tunnel is initiated from the BBERF to the PCEF.

In step 15 the PCEF initiates an IP-CAN session modification and indicates that the binding linking is required. In step 16 the DRA checks the indicator. Since binding is required, the DRA will find the corresponding binding and it will select the same PCRF as in steps 3 and 10.

In steps 17 and 18 the DRA proxies the IP-CAN session modification message to the selected PCRF and the PCRF answers with the policy decision results as the available PCC rules and the applicable event triggers.

In step 19 the DRA proxies the IP-CAN session modification response to the PCEF.

In step 20 the PCEF responds the proxy binding update to the BBERF and in step 21 the PDN connection is modified towards the UE. Last but not least in step 22 the resources in the 3GPP access are released.

Figure 8:
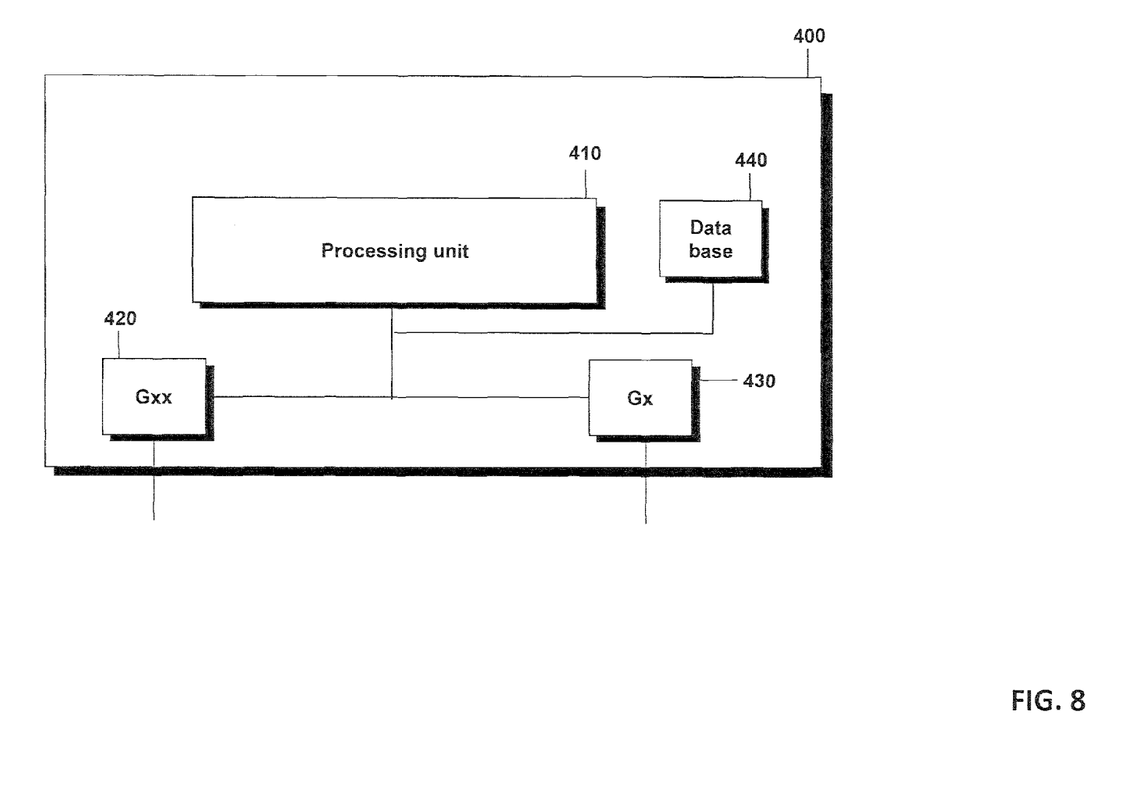
FIG. 8 is a schematic block diagram of a diameter routing unit configured to select a policy and charging control unit incorporating features of the invention.

In FIG. 8 a schematic view of a diameter routing agent 400 is shown which is configured to carry out the methods as disclosed in FIG. 6 or 7. The diameter routing unit 400 comprises input/output units, such as the interfaces Gxx 420 for a communication with the bearer binding and event reporting unit 200 (BBERF) which is shown in FIG. 10 and for the communication to the PCRF shown inter alia in FIGS. 2 and 3. The diameter routing unit 400 furthermore contains the Gx interface for a communication with the policy and charging enforcement unit (PCEF) 300 shown inter alia in FIG. 9 and for a communication with the PCRF. A processing unit 410 is provided which can check whether the indicator is set in a received message as discussed above and which, when the indicator is set, accesses a database 440 (illustrated in the implementation example of FIG. 8 as being internal to the diameter routing agent, 400) where the information is stored which policy and charging control unit, PCRF, is handling which data packet session and containing information about the available PCRFs.

Figure 9:
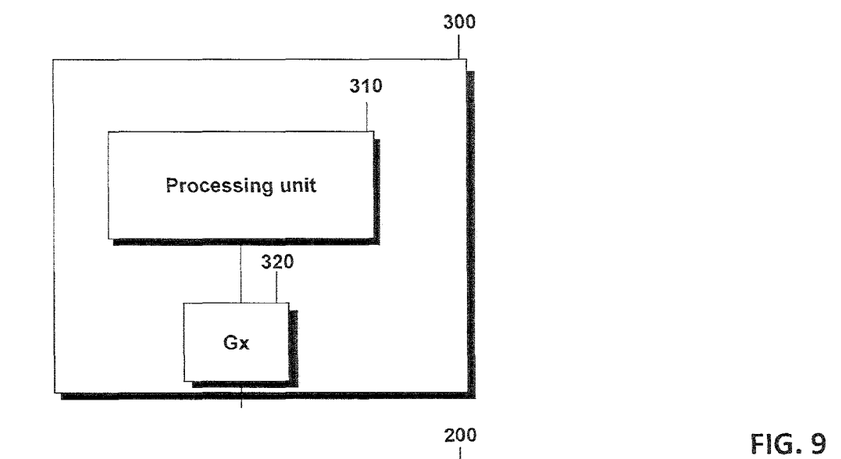
FIG. 9 is a schematic block diagram of a policy and charging enforcement unit incorporating features of the invention.
Figure 10:
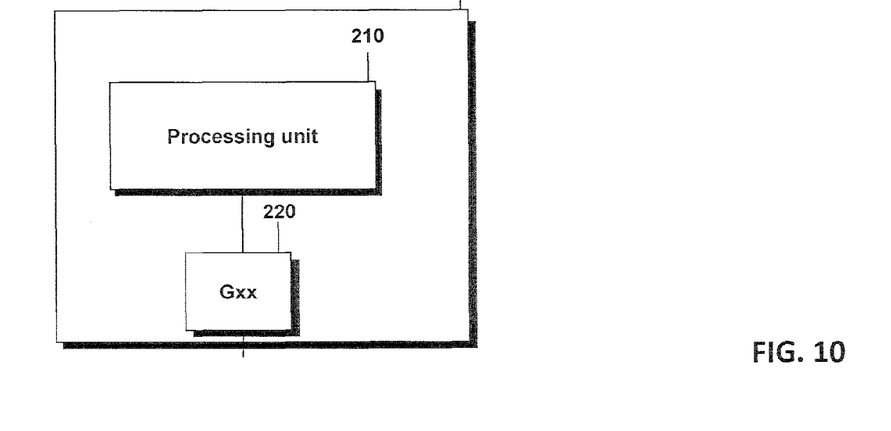
FIG. 10 is a schematic block diagram of a bearer binding and event reporting unit configured to transmit diameter messages to a diameter routing unit incorporating features of the invention.

In FIG. 9 a schematic view of a policy and charging enforcement unit, PCEF, 300 is shown which also contains input/output units such as the Gxx interface for a communication with the diameter routing unit 400. The processing unit 310 is provided which checks whether the PMIP protocol is used for the communication with the BBERF 200. The processing unit 310 controls the PCEF 300 in such a way that it can operate as described in connection with FIGS. 6 and 7.

In FIG. 10 a schematic view of the bearer binding and event reporting unit, BBERF, 200 is shown comprising the Gxx interface for the communication of diameter messages with the diameter routing unit. A processing unit 210 can check the attachment status of the mobile user entity and if handover is taking place or if the attachment status is unknown the processing unit will set the indicator and a diameter message is transmitted to the diameter routing unit 400 as described above in connection with FIG. 6 or 7.

It should be understood that the units shown in FIGS. 8 to 10 may include additional components not shown in the figure. For the sake of clarity only those components are schematically shown which are needed for the understanding of the invention. Furthermore, it should be understood that the separation of the functional entities shown in the different units of FIGS. 8 to 10 need not necessarily be incorporated in the corresponding units as shown. It should be understood that they may be incorporated in less or more different units. Furthermore, the components may be incorporated by hardware, software or a combination of hardware and software.

As described above, the Gxx interface will include an indicator so that the DRA 400 knows whether it has to find an existing binding or create a new one. For implementing the indicator one possibility would be to create a new attribute value pair, AVP, in Gxx, e.g. DRA-binding with two possible values: DRA binding required (0). This value shall be used to indicate that the DRA shall find an existing binding and use the PCRF address. This may be used when the BBERF identifies a handover case or when the handover status is unknown. The other value, no DRA binding (1) may be used to indicate that the DRA may select any available PCRF address. This is by way of example used when the BBERF identifies an attach case. In the same way the Gx interface may include the indicator to help the DRA to know if it has to find an existing binding or not. By way of example, the value 0 may be assigned for PMIP cases and the value 1 for GTP cases. In another embodiment it is possible to use a session linking indicator which would then have three different values. A first value of the indicator would mean that the DRA assigns the same PCRF than the one selected for the previously corresponding Gx session with the same APN and subscriber ID. The second possible value indicates that the DRA selects the same PCRF than the one selected for an existing Gx session with the same APN and subscriber ID. In the third possible value the DRA would assign any available PCRF.

The invention claimed is:

1. A method, by a diameter routing device, to route a diameter message of a data packet session using a diameter protocol in a mobile communications network in which at least two policy and charging control devices are provided for policy and charging control of data packet sessions, the method comprising:
   receiving a diameter message for a data packet session via one of a Gx interface and a Gxx interface;
   checking, whether in the received diameter message an indicator is set, the indicator indicating that the received message received from any one of the Gx and Gxx interfaces is relating to a data packet session for which another diameter message has already been received via the other of the Gx and Gxx interfaces and for which the policy and charging control device has already been selected;
   if the indicator is set;
      accessing a database containing information which policy and charging control device is handling which data packet session and containing information about the at least two policy and charging control devices that are available for selection by the diameter routing device;
      identifying the policy and charging control device that is controlling the data packet session to which the received diameter message belongs; and
      directing the received diameter message to the identified policy and charging control device; and
   if the indicator is not set;
      selecting any one of the at least two policy and charging control devices; and
      directing the received diameter message to the selected policy and charging control device.

2. The method according to claim 1, wherein the received diameter message is one of a message relating to a handover procedure from another mobile communications network to the mobile communications network and a message relating to a handover procedure between two different access networks of the mobile communications network.

3. The method according to claim 2, wherein the database is accessed for identifying the policy and charging control device that is controlling the data packet session to which the received diameter message belongs if the indicator is set and is not accessed for selecting any one of the at least two policy and charging control devices if the indicator is not set.

4. The method according to claim 2, wherein the diameter message is received from a Bearer Binding and Event Reporting device via the Gxx interface, the message initiating a gateway control session establishment procedure, wherein, if the indicator is set, the received message is relating to a data packet session for which the other diameter message was received from a policy and charging enforcement device via the Gx interface.

5. The method according to claim 4, further comprising:
   receiving a second diameter message via the Gx interface and checking whether the indicator is set, wherein if the indicator is set, transmitting the received second message to the policy and charging control device which was selected for the data packet session to which the other received diameter message belonged.

6. The method according to claim 2, wherein the indicator is set in the received diameter message when at least one of the following conditions is met: a packet data network connection is established by a mobile entity requesting the data packet session, and a PMIP protocol is used for a communication between a policy and charging enforcement device and a Bearer Binding and Event Reporting device.

7. The method according to claim 6, wherein the diameter message is received from a policy and charging enforcement device via the Gx interface the message initiating an IP CAN session establishment procedure, wherein if the indicator is set, the received message is relating to a data packet session for which the other diameter message was received from a Bearer Binding and Event Reporting device via the Gxx interface.

8. The method according to claim 6, wherein the diameter message is received from a Bearer Binding and Event Reporting device via the Gxx interface, the message initiating a gateway control session establishment procedure, wherein, if the indicator is set, the received message is relating to a data packet session for which the other diameter message was received from a policy and charging enforcement device via the Gx interface.

9. The method according to claim 1, wherein the database is accessed for identifying the policy and charging control device that is controlling the data packet session to which the received diameter message belongs if the indicator is set and is not accessed for selecting any one of the at least two policy and charging control devices if the indicator is not set.

10. The method according to claim 1, wherein the diameter message is received from a policy and charging enforcement device via the Gx interface the message initiating an IP CAN session establishment procedure, wherein if the indicator is set, the received message is relating to a data packet session for which the other diameter message was received from a Bearer Binding and Event Reporting device via the Gxx interface.

11. The method according to claim 1, wherein the diameter message is received from a Bearer Binding and Event Reporting device via the Gxx interface, the message initiating a gateway control session establishment procedure, wherein, if the indicator is set, the received message is relating to a data packet session for which the other diameter message was received from a policy and charging enforcement device via the Gx interface.

12. The method according to claim 11, further comprising:
receiving a second diameter message via the Gx interface and checking whether the indicator is set, wherein if the indicator is set, transmitting the received second message to the policy and charging control device which was selected for the data packet session to which the other received diameter message belonged.

13. The method according to claim 1, wherein the indicator is set in the received diameter message when at least one of the following conditions is met: a packet data network connection is established by a mobile entity requesting the data packet session, and a PMIP protocol is used for a communication between a policy and charging enforcement device and a Bearer Binding and Event Reporting unit.

14. A diameter routing device configured to route a diameter message of a data packet session using a diameter protocol in a mobile communications network in which at least two policy and charging control devices are provided for policy and charging control of data packet sessions, the diameter routing device comprising:
a Gx interface configured to receive diameter messages from a policy and charging enforcement device;
a Gxx interface configured to receive diameter messages from a Bearer Binding and Event Reporting device;
a processor configured to check, when a diameter message is received via one of the interfaces, whether in the received diameter message an indicator is set, the indicator indicating that the received message received from one of the Gx and Gxx interfaces is relating to a data packet session for which another diameter message has already been received via the other of the Gx and Gxx interfaces and for which the policy and charging control device has already been selected;
the processor being configured, if the indicator is set, to: access a database containing information which policy and charging control device is handling which data packet session and containing information about the at least two policy and charging control devices that are available for selection by the diameter routing device;
identify the policy and charging control device that is controlling the data packet session to which the received diameter message belongs; and
initiate a transmission of the received diameter message to the identified policy and charging control device; and
the processor being configured, if the indicator is not set, to:
select any one of the at least two policy and charging control devices; and
initiate a transmission of the received diameter message to the selected policy and charging control device.

15. The diameter routing device according to claim 14, wherein the mobile communications network comprises a 3GPP Evolved packet core network.

16. A method, by a policy and charging enforcement device, to transmit a diameter message of a data packet session using a diameter protocol to a diameter routing device via a Gx interface, the method comprising:
checking whether a PMIP protocol is used for a communication with a Bearer Binding and Event Reporting device;
if the PMIP protocol is used: setting an indicator in a diameter message for a data packet session initiating an IP CAN session procedure, wherein the indicator indicates to the diameter routing device that the diameter message relates to a data packet session for which another diameter message has already been received by the diameter routing device via a Gxx interface and for which a policy and charging control device has already been selected;
if the PMIP protocol is not used the indicator is not set; and
transmitting the diameter message to the diameter routing device via the Gx interface.

17. A policy and charging enforcement device configured to transmit a diameter message of a data packet session using a diameter protocol to a diameter routing device, the policy and charging enforcement unit device comprising:
a Gx interface configured to transmit diameter messages to the diameter routing device; and
a processor configured to check whether a PMIP protocol is used for a communication with a Bearer Binding and Event Reporting device;
if the PMIP protocol is used, the processor is configured to set an indicator in a diameter message for a data packet session initiating an IP CAN session procedure transmitted to the diameter routing device via the Gx interface, the indicator indicating to the diameter routing device that the diameter message relates to a data packet session for which another diameter message has already been received via a Gxx interface and for which a policy and charging control device has already been selected; and
if the PMIP protocol is not used, the processor is configured not to set the indicator in the diameter message.

18. A method, by a Bearer Binding and Event Reporting device, to transmit a diameter message of a data packet session using a diameter protocol to a diameter routing device via a Gxx interface, the method comprising:
identifying an attachment status information of a mobile user entity that is attaching to a mobile communications network;

if the attachment status information indicates that handover is one of taking place and is unknown: setting an indicator in a diameter message for a data packet session to be transmitted to the diameter routing device, the indicator indicating to the diameter routing device that the diameter message relates to a data packet session for which another diameter message has already been received by the diameter routing device via a Gx interface and for which a policy and charging control device has already been selected;

if the attachment status information indicates that the mobile user entity is initially attaching to the mobile communications network, the indicator is not set; and transmitting the diameter message to the diameter routing device via the Gxx interface.

19. A Bearer Binding and Event Reporting device configured to transmit a diameter message of a data packet session using a diameter protocol to a diameter routing device, the Bearer Binding and Event Reporting device comprising:

a Gxx interface configured to transmit diameter messages to the diameter routing device; and a processor configured to identify an attachment status information of a mobile user entity that is attaching to a mobile communications network;

if the attachment status information indicates that handover is one of taking place and is unknown, the processor is configured to set an indicator in a diameter message for a data packet session to be transmitted to the diameter routing device, the indicator indicating to the diameter routing device that the diameter message relates to a data packet session for which another diameter message has already been received by the diameter routing device via a Gx interface and for which a policy and charging control device has already been selected;

if the attachment status information indicates that the mobile user entity is initially attaching to the mobile communications network, the processor is configured not to set the indicator; and the Gxx interface is configured to transmit the diameter message to the diameter routing device.

20. A computer readable non-transitory storage medium storing instructions which, when executed on at least one processor, cause the at least one processor to carry out a method by a diameter routing device, to route a diameter message of a data packet session using a diameter protocol in a mobile communications network in which at least two policy and charging control devices are provided for policy and charging control of data packet sessions, the method comprising:

receiving a diameter message for a data packet session via one of a Gx interface and a Gxx interface;

checking, whether in the received diameter message an indicator is set, the indicator indicating that the received message received from any one of the Gx and Gxx interfaces is relating to a data packet session for which another diameter message has already been received via the other of the Gx and Gxx interfaces and for which the policy and charging control device has already been selected;

if the indicator is set;
  accessing a database containing information which policy and charging control device is handling which data packet session and containing information about the at least two policy and charging control devices that are available for selection by the diameter routing device;
  identifying the policy and charging control device that is controlling the data packet session to which the received diameter message belongs; and
  directing the received diameter message to the identified policy and charging control device; and if the indicator is not set;
  selecting any one of the at least two policy and charging control device; and
  directing the received diameter message to the selected policy and charging control device.

* * * * *